US00RE46963E

(19) United States
(12) Reissued Patent
Ogawa

(10) Patent Number: US RE46,963 E
(45) Date of Reissued Patent: Jul. 24, 2018

(54) LIQUID JETTING APPARATUS

(71) Applicant: BROTHER KOGYO KABUSHIKI KAISHA, Nagoya-shi, Aichi-ken (JP)

(72) Inventor: Mikio Ogawa, Nagoya (JP)

(73) Assignee: BROTHER KOGYO KABUSHIKI KAISHA, Nagoya-Shi, Aichi-Ken (JP)

(21) Appl. No.: 14/944,948

(22) Filed: Nov. 18, 2015

Related U.S. Patent Documents

Reissue of:
(64) Patent No.: 8,585,177
Issued: Nov. 19, 2013
Appl. No.: 13/424,434
Filed: Mar. 20, 2012

(30) Foreign Application Priority Data

Jun. 27, 2011 (JP) ..... 2011-141461

(51) Int. Cl.
*B41J 2/165* (2006.01)

(52) U.S. Cl.
CPC ..... *B41J 2/16544* (2013.01); *B41J 2/16538* (2013.01)

(58) Field of Classification Search
CPC ..... B41J 2/16538; B41J 2/16544
USPC ..... 347/33
See application file for complete search history.

(56) References Cited

U.S. PATENT DOCUMENTS 4,340,897 A * 7/1982 Miller ..... B41J 2/16538 347/33
5,103,244 A * 4/1992 Gast et al. ..... 347/33
5,115,250 A * 5/1992 Harmon et al. ..... 347/33
5,614,930 A * 3/1997 Osborne ..... B41J 2/16538 347/22
5,706,038 A * 1/1998 Jackson ..... B41J 2/16538 347/31
6,416,161 B1 * 7/2002 Berg et al. ..... 347/33
6,454,385 B1 * 9/2002 Anderson et al. ..... 347/28
6,561,619 B1 * 5/2003 Shibata et al. ..... 347/33
7,614,721 B2 11/2009 Ito et al.
2004/0130589 A1 * 7/2004 Nagase ..... B41J 2/16535 347/33
2005/0195240 A1 9/2005 Hiraki
(Continued)

FOREIGN PATENT DOCUMENTS

JP 2001-219568 A 8/2001
JP 2002-273896 9/2002
JP 2005-40975 2/2005
(Continued)

*Primary Examiner* — Minh T Nguyen
(74) *Attorney, Agent, or Firm* — Merchant & Gould P.C.

(57) ABSTRACT

There is provided a liquid jetting apparatus including: a liquid jetting head which has a liquid jetting surface on which a plurality of nozzles are open to jet the liquid; a wiper which moves, relative to the liquid jetting surface, in a wiping direction along the liquid jetting surface, while being brought in contact with the liquid jetting surface, to wipe the liquid adhered on the liquid jetting surface; a wiper moving mechanism which moves the wiper in a direction orthogonal to the liquid jetting surface to approach to or separate from the ink jetting surface; a stopper which makes contact with the wiper which is separated from the ink jetting surface; and an impact-absorbing member which is formed in the wiper or the stopper and absorbs impact generated in a case that the wiper collides with the stopper.

30 Claims, 14 Drawing Sheets

(56) References Cited

U.S. PATENT DOCUMENTS

| | | | | |
|---|---|---|---|---|
| 2006/0055729 | A1* | 3/2006 | Anderson, Jr. | B41J 2/16535 347/33 |
| 2008/0158293 | A1* | 7/2008 | Hung | 347/33 |

FOREIGN PATENT DOCUMENTS

| | | |
|---|---|---|
| JP | 2005-246929 | 9/2005 |
| JP | 2006-247999 | 9/2006 |
| JP | 4131046 | 8/2008 |

* cited by examiner

LIQUID JETTING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS REFERENCE] *CROSS-REFERENCE* TO RELATED APPLICATION

The present application *is a reissue of U.S. Pat. No. 8,585,177, which further* claims priority from Japanese Patent Application No. 2011-141461, filed on Jun. 27, 2011, the disclosure of *both of* which [is] *are* incorporated herein by reference in [its] *their* entirety.

BACKGROUND OF THE INVENTION

1. Field of the Invention

The present invention relates to a liquid jetting apparatus which jets liquid.

2. Description of the Related Art

There has been known a liquid jetting apparatus which includes a liquid droplet jetting head having a liquid jetting surface on which a plurality of nozzles are open to jet the liquid and a wiper which wipes the liquid adhered on the liquid jetting surface.

For example, as the liquid jetting apparatus having the wiper described above, Japanese Patent No. 4131046 discloses a printer which jets ink on a printing paper sheet from nozzles of a printing head to record an image etc. (see FIG. 11 in Japanese Patent No. 4131046). In this printer, the wiper is held by a wiper holder. The wiper holder is moved upwardly and downwardly in a direction perpendicular to the ink jetting surface on which the nozzles of the printing head are open to move the wiper between a wiping position at which the wiper is brought in contact with the ink jetting surface and a waiting position at which the wiper and the ink-jetting surface are in a separated state.

In particular, the wiper holder which holds the wiper is urged by a spring in a direction in which the wiper is separated from the ink jetting surface. The wiper holder is pushed and moved upwardly by a guide. Then, an engaging claw formed on the wiper holder is fitted into (engaged with) an engagement-receiving portion formed on a base provided in a printer main body. Accordingly, the wiper holder is engaged at the wiping position, at which the wiper holder is moved upwardly against the biasing force of the spring. When the engagement of the engaging claw with the engagement-receiving portion is released, the wiper holder is moved downwardly by the biasing force of the spring and is brought in contact with a stopper formed in the base at the lower surface thereof. Accordingly, the wiper holder is placed at the waiting position.

In general, the wiper holder which holds the wiper and/or the base which includes the stopper is/are formed of, for example a synthetic resin, to have a high strength in order to maintain shape(s), posture(s), etc., of the wiper holder and/or the stopper. However, in a case that the wiper holder and/or the stopper is/are formed to have the high strength and that the wiper is separated from the liquid jetting surface immediately after the wiping to hit the wiper holder against the stopper, any impact or shock generates to vibrate the wiper due to, for example, the biasing force of the spring, like the wiper described above, or a fall of the wiper by the self-weight. When the impact described above generates to vibrate the wiper having the liquid adhered at the time of the wiping of the liquid jetting surface, the liquid adhered on the wiper is scattered to the surroundings.

In view of the above, an object of the present teaching is to provide a liquid jetting apparatus which prevents the liquid adhered on the wiper from being scattered to the surroundings when the wiper separated from the liquid jetting surface makes contact with the stopper.

SUMMARY OF THE INVENTION

According to an aspect of the present teaching, there is provided a liquid jetting apparatus which jets liquid, including:

a liquid jetting head which has a liquid jetting surface on which a plurality of nozzles are open to jet the liquid;

a wiper which moves, relative to the liquid jetting surface, in a wiping direction along the liquid jetting surface, while being brought in contact with the liquid jetting surface, to wipe the liquid adhered on the liquid jetting surface;

a wiper moving mechanism which moves the wiper in a direction orthogonal to the liquid jetting surface to approach to or separate from the ink jetting surface;

a stopper which makes contact with the wiper which is separated from the ink-jetting surface; and an impact-absorbing member which is formed in the wiper or the stopper to absorb an impact generated by a collision between the wiper and the stopper.

According to the liquid jetting apparatus of the present teaching, the impact, which is generated when the wiper which wiped the liquid jetting surface is separated from the liquid jetting surface to make contact with the stopper, is absorbed into the impact-absorbing member. Thus, it is possible to suppress vibration of the wiper generated when the wiper contacts with the stopper. Accordingly, it is possible to prevent the liquid adhered on the wiper from being scattered to the surroundings when the wiper separated from the liquid jetting surface is brought in contact with the stopper.

DESCRIPTION OF THE PREFERRED EMBODIMENTS

Figure 1:
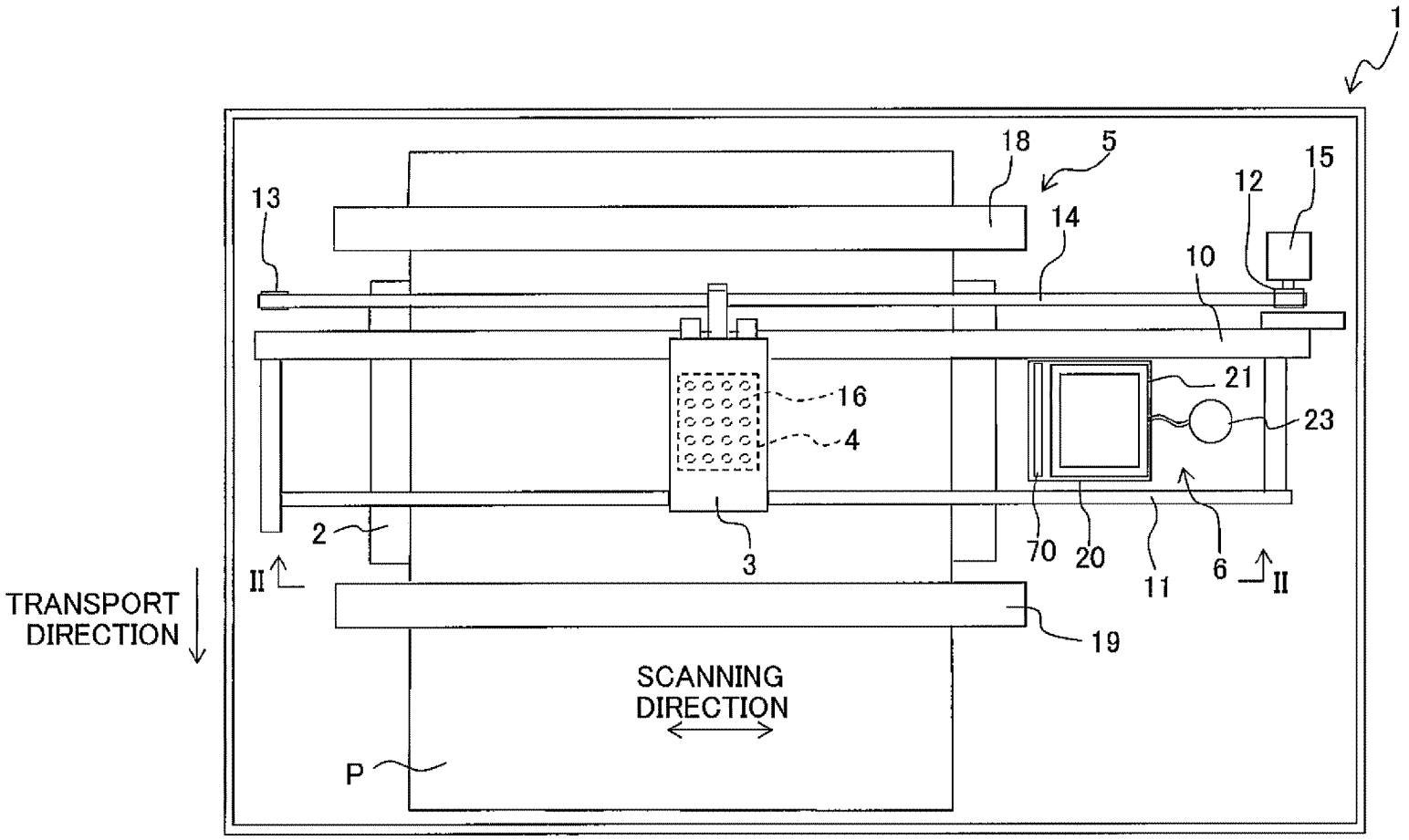
FIG. 1 is a plan view schematically showing a construction of an ink jet printer according to this embodiment.
Figure 2:
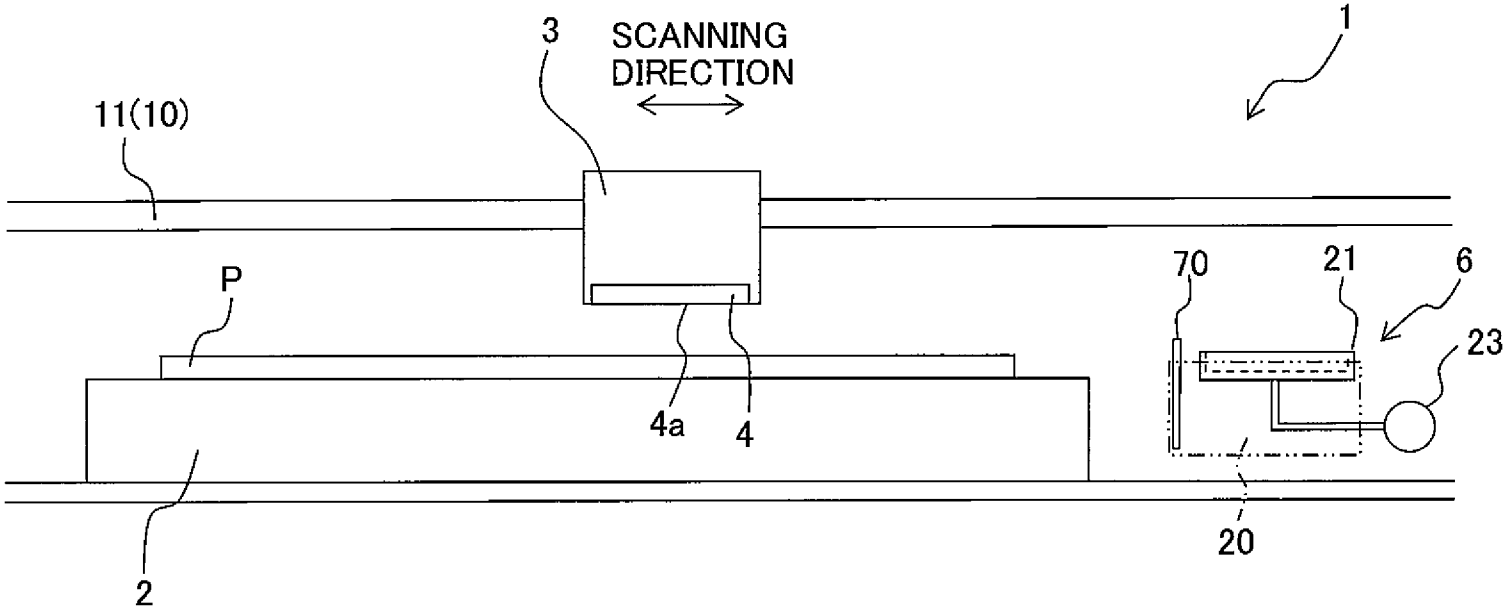
FIG. 2 is a view taken along line II-II in FIG. 1.

Next, an embodiment of the present teaching will be explained. In the present description, a frontward direction, a rearward direction, a left side (left direction), and a right side (right direction) in the plan view of FIG. 1 are defined as the frontward direction, the rearward direction, the left side (left direction), and the right side (right direction), respectively. Further, a direction perpendicular to the paper surface of FIG. 1 (upward and downward directions in the front view of FIG. 2) is defined as the upward and downward directions. These definitions are appropriately used in the following description. In FIG. 2, a maintenance base 20 which will be described later is depicted by two-dot lines so that an interior of the maintenance base 20 is illustrated.

As shown in FIGS. 1 and 2, an ink jet printer 1 (liquid jetting apparatus) includes, for example, a platen 2 on which a recording paper sheet P is placed, a carriage 3 which is configured to be reciprocatively movable in a scanning direction parallel to the platen 2, an ink-jet head 4 (liquid droplet jetting head) which is carried on the carriage 3, a transport mechanism 5 which transports the recording paper sheet P in a transport direction perpendicular to the scanning direction, and a maintenance unit 6 which performs various maintenance operations to recover liquid jetting performance of the ink-jet head 4.

The recording paper sheet P supplied from an unillustrated paper feed mechanism is placed on an upper surface of the platen 2. Two guide rails 10, 11 extending parallel in a left-right direction (scanning direction) of FIG. 1 are provided over or above the platen 2. The carriage 3 is configured to be reciprocatively movable in the scanning direction along the two guide rails 10, 11 in an area facing the platen 2. Further, the two guide rails 10, 11 extend to a position (maintenance position) separated in the rightward direction as shown in FIG. 1 along the scanning direction from the platen 2. The carriage 3 is constructed to be movable from an area (recording area) facing the recording paper sheet P on the platen 2 to the maintenance position as a non-recording area.

Further, an endless belt 14 wound and applied between two pulleys 12, 13 is connected to the carriage 3. When the endless belt 14 is driven to travel by a carriage driving motor 15, the carriage 3 is moved in the scanning direction in accordance with the travel of the endless belt 14.

The ink-jet head 4 is attached to a lower portion of the carriage 3. A plurality of nozzles 16 are formed on the lower surface of the inkjet head 4 which is parallel to the upper surface of the platen 2. That is, the lower surface of the ink jet head 4 is an ink-jetting surface 4a (liquid jetting surface). Ink is jetted from the plurality of nozzles 16 of the ink jetting surface 4a toward the recording paper sheet P placed on the platen 2.

The transport mechanism 5 has two transport rollers 18, 19 which are disposed on opposite sides of the platen 2 to interpose the platen 2 in the transport direction. The recording paper sheet P, which is placed on the platen 2, is transported in the transport direction (frontward direction as viewed in FIG. 1) by the two transport rollers 18, 19.

The ink jet printer 1 jets the ink from the ink-jet head 4, which is reciprocatively moved in the scanning direction (left-right direction as shown in FIG. 1) together with the carriage 3, with respect to the recording paper sheet P placed on the platen 2, and at the same time, the ink jet printer 1 transports the recording paper sheet P in the transport direction by the two transport rollers 18, 19. Accordingly, the ink jet printer 1 prints a desired image, letters, and the like, on the recording paper sheet P.

The maintenance unit 6 executes a suction purge, in which the ink is sucked and discharged from the nozzles 16 to remove any foreign matters, bubbles, etc., mixed in the ink jet head 4, and a wiping of the ink adhered on the ink jetting surface 4a. That is, the maintenance unit 6 is provided to recover and maintain the ink jetting performance of the ink jet head 4.

The maintenance unit 6 is disposed on a moving path in the scanning direction of the carriage 3 at a position, which is separated from the platen 2 toward the right side in FIG. 1 in the scanning direction. In other words, the maintenance unit 6 is arranged at a position at which the ink-jet head 4 faces the ink jetting surface 4a when the ink-jet head 4 moves to the maintenance position as the non-recording area together with the carriage 3. The maintenance unit 6 is provided with a maintenance base 20, a suction cap 21 which makes contact with the ink-jetting surface 4a of the ink-jet head 4 to cover the nozzles 16, a suction pump 23 which is connected to the suction cap 21, and a wiper 70 which wipes the ink adhered on the ink jetting surface 4a after the suction purge, etc.

At first, the suction cap 21 will be explained. The suction cap 21 is formed of a flexible material such as rubber or a synthetic resin. The suction cap 21 is installed to be movable in the upward and downward directions with respect to the maintenance base 20. The suction cap 21 is arranged to face the ink jetting surface 4a of the ink jet head 4 in the case that the ink jet head 4 is placed at the maintenance position. The suction cap 21 is driven upwardly by an unillustrated elevating motor in a state that the suction cap 21 is opposed to the ink jetting surface 4a. Accordingly, the suction cap 21 comes into close contact with the ink jetting surface 4a of the ink jet head 4 to cover the nozzles 16.

When the suction pump 23 is driven in the state that the suction cap 21 is brought in tight contact with the ink jetting surface 4a to cover the nozzles 16, air in a closed space, which is defined by the suction cap 21 and the ink jetting surface 4a, is sucked to reduce pressure. In this situation, the ink in the ink jet head 4 is sucked and discharged (suction purge) from the nozzles 16 into the suction cap 21. Accordingly, it is possible to discharge viscosity-increased ink in the nozzles 16 and the bubbles mixed in ink channels in the ink jet head 4 from the nozzles 16 together with the ink. The suction purge is performed at a predetermined time intervals or after a timing at which the bubbles are more likely to be mixed in the ink channels in the ink jet head 4, such as after an exchange of the cartridge.

Figure 3:
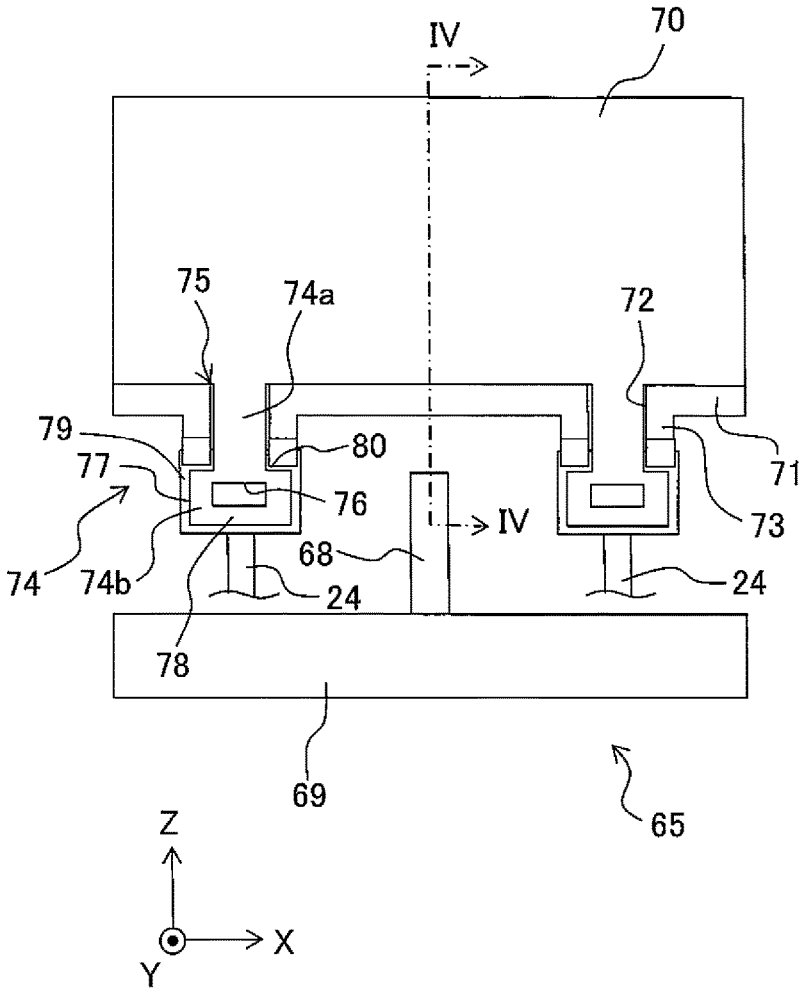
FIG. 3 shows a wiper as viewed in a scanning direction.
Figure 4:
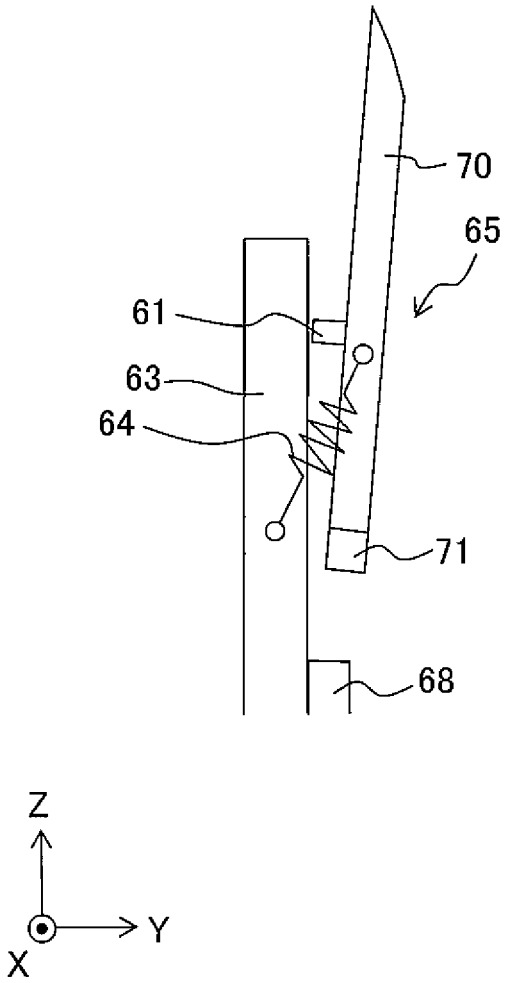
FIG. 4 is a cross-sectional view taken along line IV-IV in FIG. 3.
Figure 5:
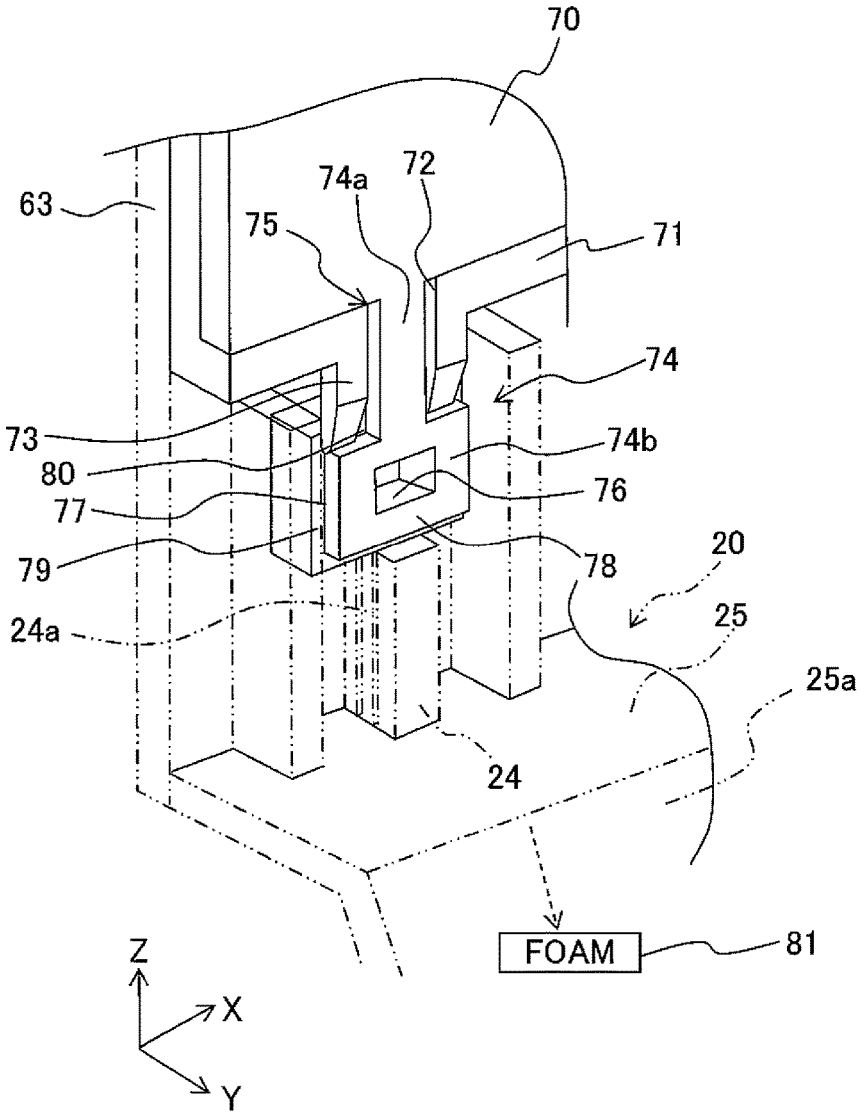
FIG. 5 is an enlarged perspective view showing a portion in the vicinity of an impact-absorbing portion of the wiper.

Next, the wiper 70 will be explained. As shown in FIG. 3 to FIG. 5, it is appropriately defined in the following description that the transport direction is the X direction, the scanning direction is the Y direction, and the upward-downward direction is the Z direction. In FIG. 5, in order to make the view easy to see, the maintenance base 20 is depicted by the two-dot lines.

As shown in FIG. 1 to FIG. 3, the wiper 70 is a flat plate-shaped member which is made of an extremely elastic material such as the rubber or the synthetic resin. The size of the wiper 70 in the transport direction (X direction) is not less than the width of the ink jetting surface 4a. The wiper 70 is arranged to be parallel to the vertical direction. Further, the wiper 70 is disposed adjacently to the suction cap 21 in the inside of the maintenance base 20 on a side closer to the printing area with respect to the scanning direction than the suction cap 21. The wiper 70 is installed to be movable in the upward and downward directions with respect to the maintenance base 20. The wiper 70 is driven upwardly and downwardly between a wiping position at which the wiper 70 is brought in contact with the ink jetting surface 4a and a waiting position at which the wiper 70 and the ink jetting surface 4a are in a separated state, by a wiper driving mechanism 65 provided in the maintenance base 20.

As shown in FIG. 3 to FIG. 5, the wiper 70 is held by a wiper holder 71 which is made of a material having the high strength such as the synthetic resin. The wiper holder 71 holds the wiper 70 from the side of the lower surface of the wiper 70. Two recesses 72, which are arranged while providing spacing distances in the X direction (left and right directions of FIG. 3), are formed in the wiper 70. The recesses 72 are dented in the Y direction perpendicular to the X direction. Projections 73 (regulating members) which project downward are formed on opposite sides of each of the recesses 72 of the wiper holder 71. The projections 73 (regulating members) are inclined so that the thickness is gradually decreased (becomes thin) toward the front end.

Two impact-absorbing portions 74 (protruding portions), each of which projects from the lower surface of the wiper 70 to a position lower than the wiper holder 71, are provided in wiper 70 at positions which are the same in the X direction as those of the recesses 72 of the wiper holder 71. Each of the impact-absorbing portions 74 is formed to have a width slightly smaller than the width of each of the recesses 72 in the X direction. Each of the impact-absorbing portions 74 includes a connection portion 74a which is arranged inside of each of the recesses 72, and a contact portion 74b which is connected to the end portion of the connection portion 74a and makes contact with the front end (upper surface) of a rib 24 (stopper) provided in the maintenance base 20.

The width of the rib 24 of the maintenance base 20 is formed to be smaller than the width of the contact portion 74b. Further, the maintenance base 20 includes a foam 81 (see FIG. 5) which is made of a porous material etc., to absorb the ink adhered on the wiper 70. The foam 81 is arranged at a position at which the ink, which flows from the wiper 70 via the rib 24, can be absorbed by the foam 81. In this embodiment, the foam 81 is connected to the forward end of a slope 25a of a plate member 25 (see FIG. 5) which supports the rib 24 of the maintenance base 20. The foam 81 may be disposed at any position provided that the ink, which flows from the wiper 70 via the rib 24, can be absorbed by the foam 81. For example, the foam 81 may be disposed at a position separated in the downward direction from the front end of the slope 25a of the plate member 25.

A gap 75, which has a width to such an extent that capillary force acts on the ink, is formed between the connection portion 74a disposed at the recess 72 of the wiper holder 71 and the two projections 73 disposed on the opposite sides of the recess 72 of the wiper holder 71. Further, a through hole 76, which penetrates through the contact portion 74b in the Y direction, is formed in the contact portion 74b. A stepped portion 79 is formed on the side surface of the contact portion 74b as follows. That is, the stepped portion 79 communicates with the gap 75 formed by the connection portion 74a and the projections 73 to detour around the through hole 76, and reaches the rib 24. A valley-shaped edge 77 is formed by the corner of the stepped portion 79. The through hole 76 is formed in the contact portion 74b at a position corresponding to the position immediately above the rib 24. By doing so, a thin portion 78 which is thin in the upward and downward directions (Z direction) is formed in the contact portion 74b at a position which overlaps in the upward and downward directions with the rib 24.

Since the stepped portion 79 is formed in the contact portion 74b, a recess 80 which is dented in the scanning direction (Y direction) is formed in the impact-absorbing portion 74. The front end of each of the projections 73 of the wiper holder 71 is fitted into the recess 80. In other words, each of the projections 73 of the wiper holder 71 faces the contact portion 74b in the scanning direction and the transport direction. In this construction, the back surface of the connection portion 74a (the back side of the page of FIG. 3) is brought into surface contact with the wiper holder 71 and the surface of the stepped portion 79 of the connection portion 74b (the front side of the page of FIG. 3) is brought into surface contact with the each of the projections 73 of the wiper holder 71. Accordingly, the impact-absorbing portion 74 is sandwiched by the wiper holder 71 from both sides in the Y direction.

Further, a groove 24a, which communicates with the valley-shaped edge 77 of the contact portion 74b to reach the foam 81, is formed in the upward and downward directions in the rib 24. With this groove 24a, the ink which is adhered on the wiper 70 at the time of the wiping of the ink jetting surface 4a is more likely to be pulled, due to the capillary force, into the gap 75 formed by the two recesses 73 and the connection portion 74a disposed at the recess 72. Further, the ink pulled into the gap 75 is moved along the valley-shaped edge 77 formed in the contact portion 74b due to the capillary force. Accordingly, it is possible to remove the ink adhered on the wiper. The ink flowing from the wiper 70 via the valley-shaped edge 77 of the contact portion 74b further flows on a side of the rib 24 along the groove 24a communicating with the valley-shaped edge 77, and then flows into the foam 81. It is noted that a space of the gap 75 is approximately 0.5 mm and the width of the groove 24a is approximately 0.5 mm. Further, a gap between the wiper 70 and the wiper holder 71 is approximately 0.2 mm. The dimensions described above are merely examples, and the present teaching is not limited thereto.

As shown in FIGS. 3 and 4, the wiper driving mechanism 65 includes a support plate 63 which makes contact with a side surface of the wiper 70 on the side of the printing area to support the wiper 70, a tension spring 64 which connects the wiper 70 with the support plate 63, a cam follower 68 which can make contact with the bottom surface of the wiper holder 71, and a rotary cam 69 having a cam surface which makes contact with the cam follower 68.

The support plate 63 is formed to have a width which is approximately same as that of the wiper 70 in the X direction. The support plate 63 is firmly provided to the maintenance base 20 and contacts with a substantially lower half portion of the surface of the wiper 70 on the side of the printing area. The tension spring 64 connects both end portions of the wiper 70 to both end portions of the support plate 63 in the transport direction, respectively. One end portion of the tension spring 64 is connected to the substantial center portion of the wiper 70 in a height direction (Z direction), and the other end portion of the tension spring 64 is connected to the support plate 63. The other end portion of the tension spring 64 is arranged at the support plate 63 on a lower side of the wiper 70 in the height direction as compared with the one end portion connected to the wiper 70. The tension spring 64 urges or biases the wiper 70 with respect to the support plate 63 in the left lower direction of FIG. 4. The cam follower 68 is constructed to be movable in the upward and downward directions along the cam surface by the rotation of the rotary cam 69. The upper surface of the cam follower 68 can make contact with the lower surface of the wiper holder 71. The cam follower 68 moves the wiper 70 between the wiping position and the waiting position.

Figure 6A:
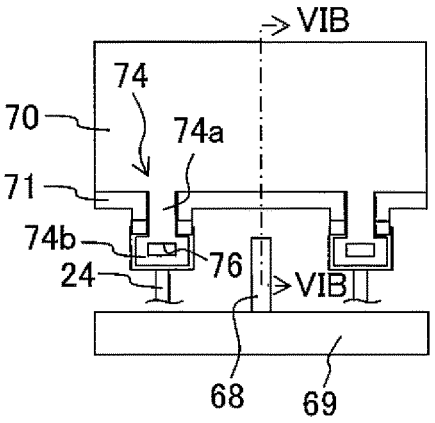
FIGS. 6A, 6B, 6C and 6D are illustrative views each illustrating a process of movement to an upward direction of the wiper.
Figure 6B:
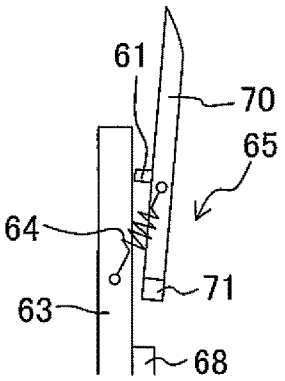

Next, an explanation will be made about a process of movement of the wiper 70 in the upward and downward directions. At first, the process of movement of the wiper 70 in the upward direction will be explained. As shown in FIGS. 6A and 6B, when the wiper 70 is located at the waiting position, the contact portion 74b of the impact-absorbing portion 74 is pulled downward by the biasing force of the tension spring 64 to make contact with the rib 24. The cam follower 68 does not make contact with the wiper holder 71.

Figure 6C:
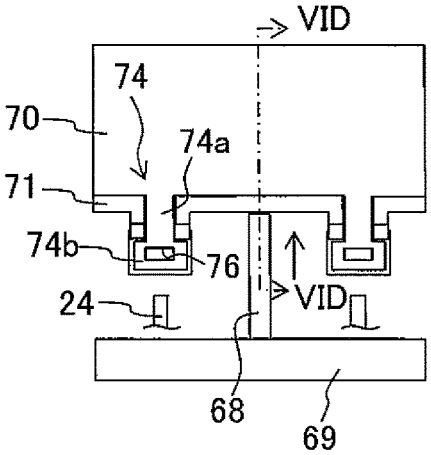
Figure 6D:
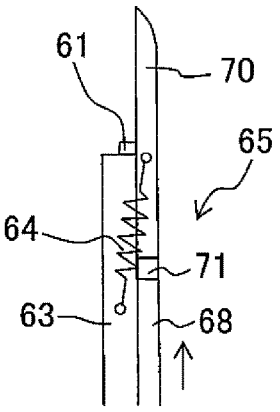

As shown in FIGS. 6C and 6D, when the rotary cam 69 is rotated to move the cam follower 68 in the upward direction, the cam follower 68 makes contact with the wiper holder 71 to push the wiper holder 71 and wiper 70 upwardly against the basing force of the tension spring 64. When a protruded-shape engaging portion 61, which is formed on the surface of the wiper 70 on the side of the printing area at the substantially center portion in the upward and downward directions, is moved upwardly as compared with the upper surface of the support plate 63, the wiper 70 is pulled toward the support plate 63 by the biasing force of the tension spring 64 to incline in the counterclockwise direction of FIGS. 6C and 6D, with the base end contacting with the support plate 63 as the center.

Thereafter, the cam follower 68 is moved away from the wiper holder 71 by rotating the rotary cam 69 to move the cam follower 68 downwardly in a state that the engaging portion 61 of the wiper 70 and the support plate 63 are overlapped in the upward and downward directions with each other. In this situation, the engaging portion 61 of the wiper 70 is brought in contact with the upper surface of the support plate 63 to regulate the movement of the wiper 70 to the downward direction. At this height position, the front end of the wiper 70 can contact with the ink jetting surface 4a. Accordingly, the wiper 70 is positioned at the wiping position at which the wiper 70 can contact with the ink jetting surface 4a.

Figure 7A:
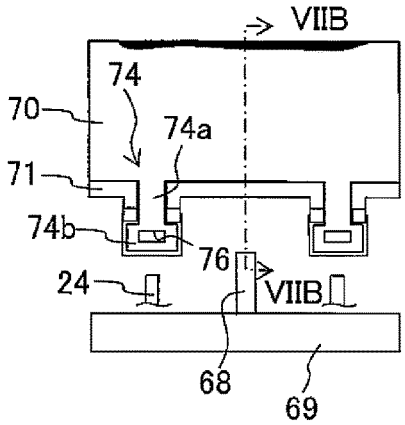
FIGS. 7A, 7B, 7C, 7D, 7E and 7F are illustrative views each illustrating a process of movement to a downward direction of the wiper.
Figure 7B:
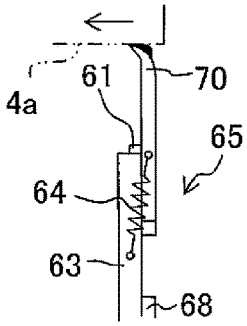

Next, an explanation will be made about the process of movement of the wiper 70 to the downward direction. As shown in FIGS. 7A and 7B, in a state that the wiper 70 is located at the wiping position, the ink jet head 4 is moved in the scanning direction toward the printing area together with the carriage 3 after the suction purge. In this situation, the wiper 70 moves, relative to the ink jetting surface 4a, in a direction (wiping direction) from the left side to the right side in FIGS. 7A and 7B. The wiper 70 is bent by being brought in contact with the ink jetting surface 4a of the ink jet head 4. When the ink jet head 4 moves in a direction (direction opposite to the wiping direction) from the right side to the left side in FIGS. 7A and 7B, the wiper 70 wipes the ink jetting surface 4a in the wiping direction to wipe the ink adhered on the ink jetting surface 4a.

Figure 7C:
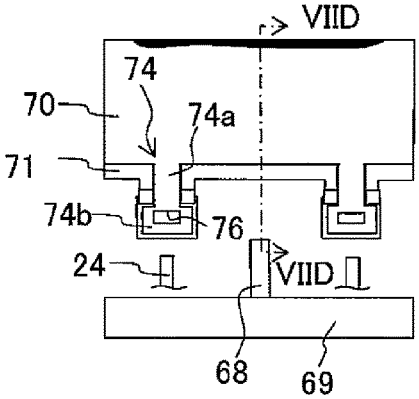
Figure 7D:
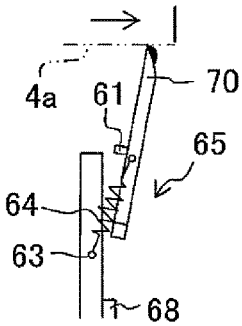

As shown in FIGS. 7C and 7D, the ink jet head 4 is moved, together with the carriage 3, in an opposite direction opposite to the direction described above. That is, the ink jet head 4 is moved toward the side of the suction cap 21 in the scanning direction so as to bring the ink jet head 4 back to the maintenance position. In this situation, the wiper 70 moves, relative to the ink jetting surface 4a, in the direction opposite to the wiping direction. Then, the wiper 70 in the bent state inclines in the clockwise direction of FIGS. 7C and 7D, with the end portion on the lower side of FIGS. 7C and 7D as an axis. When the contact between the engaging portion 61 of the wiper 70 and the support plate 63 is released, the wiper 70 slidably moves in the downward direction by the biasing force of the tension spring 64, in a state that the engaging portion 61 and the base end of the wiper 70 are brought in contact with the support plate 63. That is, the wiper 70 moves toward a retract position disposed below while moving, relative to the ink jetting surface 4a, in the direction opposite to the wiping direction.

Figure 7E:
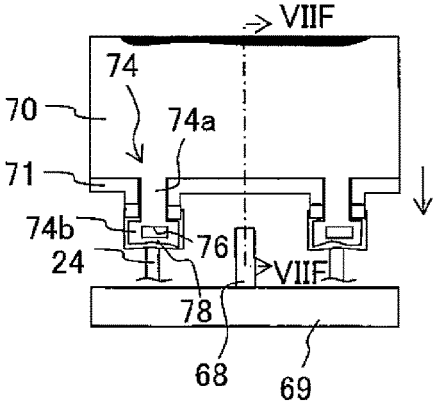
Figure 7F:
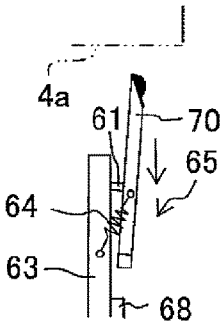

Then, the contact portion 74b of the impact-absorbing portion 74 is pulled by the biasing force of the tension spring 64 in the downward direction to make contact with the rib 24. As shown in FIGS. 7E and 7F, the wiper 70 is separated from the ink jetting surface 4a while returning to the original form to move to the waiting position. Then, the wiping operation is completed. In the above description, an explanation will be made about the process of movement of the wiper 70 from the wiping position to the waiting position according to the movement of the ink jet head 4 in the scanning direction. Since the process of the movement of the wiper 70 from the wiping position to the waiting position by the wiper driving mechanism 65 has been publicly known, any explanation of which will be omitted.

According to the ink-jet printer 1 in this embodiment, when the wiper 70 which wiped the ink-jetting surface 4a is moved away from the ink-jetting surface 4a to make contact with the rib 24 of the maintenance base 20, the upper wiping portion of the wiper 70 does not directly collide with the rib 24. Rather, the impact-absorbing portion 74 (the thin portion 78 of the contact portion 74b) directly collides with the rib 24. Accordingly, the impact of the wiper 70 is absorbed into the impact-absorbing portion 74. Therefore, it is possible to suppress the vibration of the upper wiping portion of the wiper 70 generated when the wiper 70 makes contact with the rib 24. Therefore, it is possible to prevent the ink adhered on the wiper 70 from being scattered to the surroundings.

Further, the wiper 70 is made of the elastic material, and the impact-absorbing portion 74 is configured integrally with the wiper 70. In this construction, it is possible to absorb the impact to the rib 24 caused by the wiper 70 by using the impact-absorbing portion 74, which is made of the elastic material and is configured integrally with the wiper 70. Thus, it is not necessary to form the impact-absorbing portion 74 as a member independently of the wiper 70. Further, there is no fear that the impact-absorbing portion 74 is removed or detached, due to the impact, from the wiper 70, as compared with the case in which the impact-absorbing portion 74 is formed as the member independently of the wiper 70.

Further, an entire surface of an end surface of the wiper 70 is not brought in contact with the rib 24, but the impact-absorbing portion 74 which protrudes from a part of the end surface of the wiper 70 is brought in contact with the rib 24. Accordingly, rigidity of the impact-absorbing portion 74 becomes small and thereby making it possible to further suppress the vibration of the wiper 70 generated when the wiper 70 makes contact with the rib 24. Thus, it is possible to absorb the greater impact.

In addition, in the impact-absorbing portion 74, the through hole 76 penetrating in the X direction is formed and thereby the thin portion 78 is provided. Accordingly, the rigidity of the impact-absorbing portion 74 becomes small to further suppress the vibration of the wiper 70, and it is possible to absorb the greater impact. Further, the rib 24 having the small width is brought in contact with the impact-absorbing portion 74 at the position which overlaps in the upward and downward directions with the through hole 76 of the impact-absorbing portion 74. Therefore, it is possible to make the impact-absorbing portion 74 be deformed easily.

Since each of the projections 73 of the wiper holder 71 regulates the bend of the impact-absorbing portion 74 in the X and Y directions, the impact-absorbing portion 74 can be extensible/contractible only in the upward and downward directions. Thus, when the wiper 70 is moved to the waiting position from the wiping position, the impact-absorbing portion 74 which collided with the rib 24 can be compressed reliably without being bent. Therefore, the vibration of the wiper 70 can be further suppressed and the greater impact can be absorbed. It is noted that it is possible to change Young's modulus of the impact-absorbing portion 74 by changing the material used to form the impact-absorbing portion 74 and it is possible to change the thickness of the thin portion 78 by changing the size of the through hole 76 in the upward and downward directions and/or the height position at which the through hole 76 is formed. As described above, it is possible to appropriately set a degree of the impact caused by the wiper 70 which can be absorbed by the impact-absorbing portion 74.

Each of the projections 73 which regulates bending of the impact-absorbing portion 74 is configured integrally with the wiper holder 71. Therefore, if the wiper holder 71 is accurately positioned with respect to the wiper 70, each of the projections 73 is also accurately positioned with respect to the wiper 70. Accordingly, it is possible to fit each of the projections 73 into the recess 80 and it is possible to regulate the bend of the impact-absorbing portion 74 reliably. Further, it is possible to regulate that the wiper 70 configured integrally with the impact-absorbing portion 74 moves in a direction away from the rib 24 with respect to each of the projections 73. Accordingly, each of the projections 73 is less likely to be removed or detached and a position deviation thereof is less likely to occur.

Next, modified embodiments in which various modifications are made in the embodiment will be described below. However, the constitutive parts or components, which are the same as or equivalent to those of the embodiment described above, are designated by the same reference numerals, any explanation of which will be omitted as appropriate.

In this embodiment, the impact-absorbing portion 74 is configured integrally with the wiper 70. However, the impact-absorbing portion 74 may be formed by a member independently of the wiper 70. Hereinbelow, an example thereof will be described below.

Figure 8:
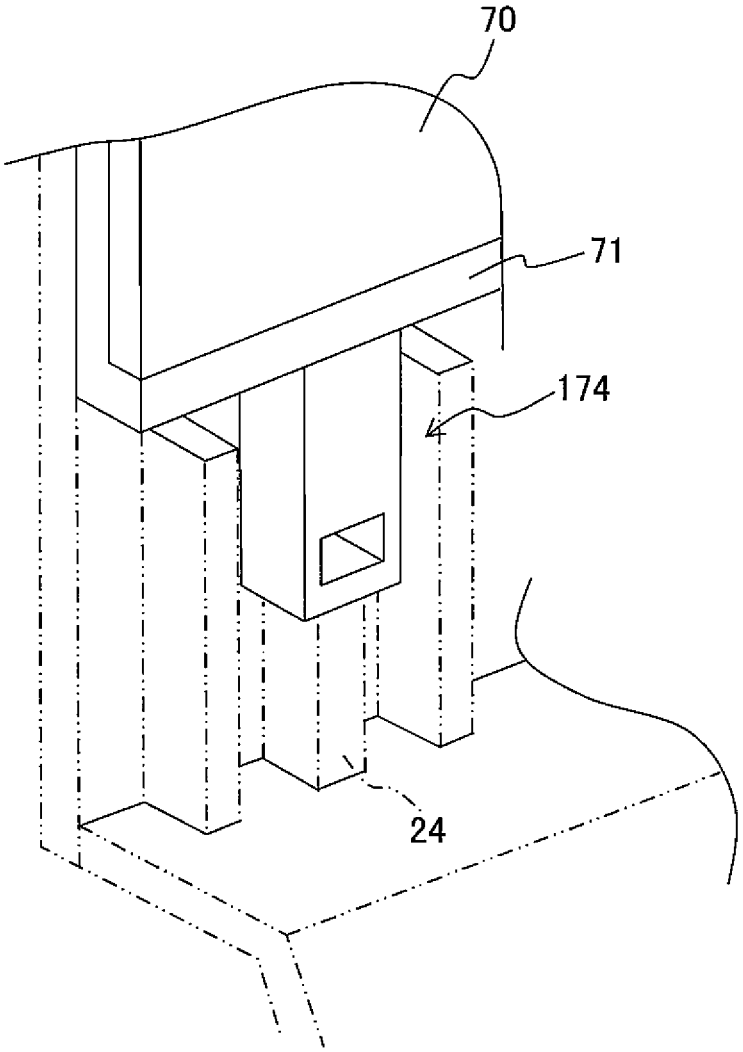
FIG. 8 is an enlarged perspective view showing a portion in the vicinity of the impact-absorbing portion of the wiper in a modified embodiment.
Figure 9:
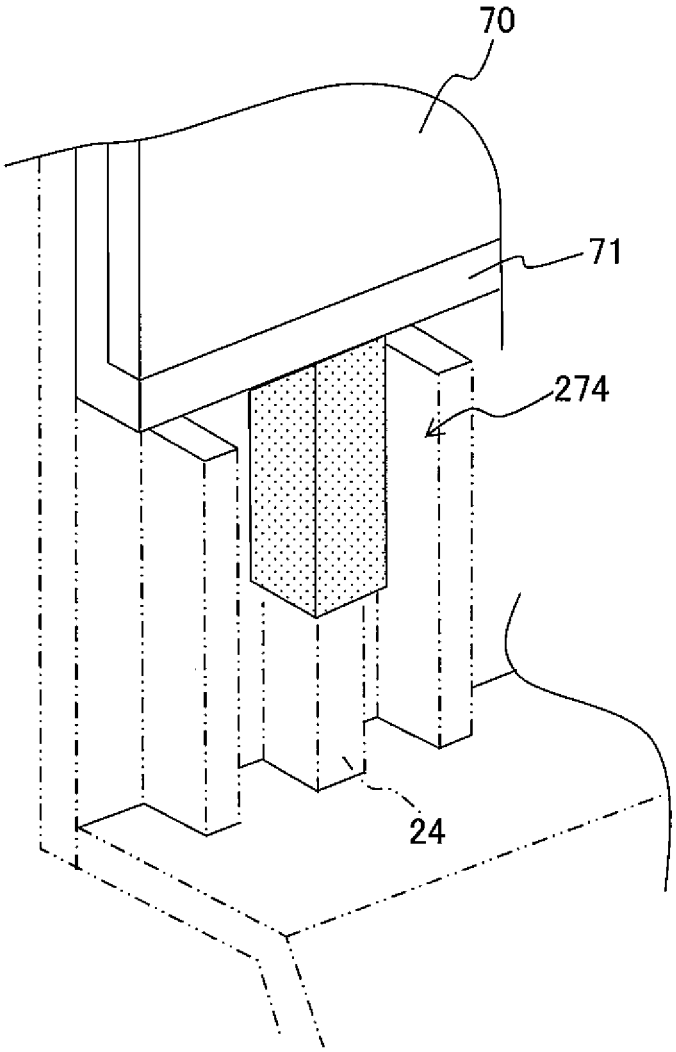
FIG. 9 is an enlarged perspective view showing a portion in the vicinity of the impact-absorbing portion of the wiper in another modified embodiment.
Figure 10:
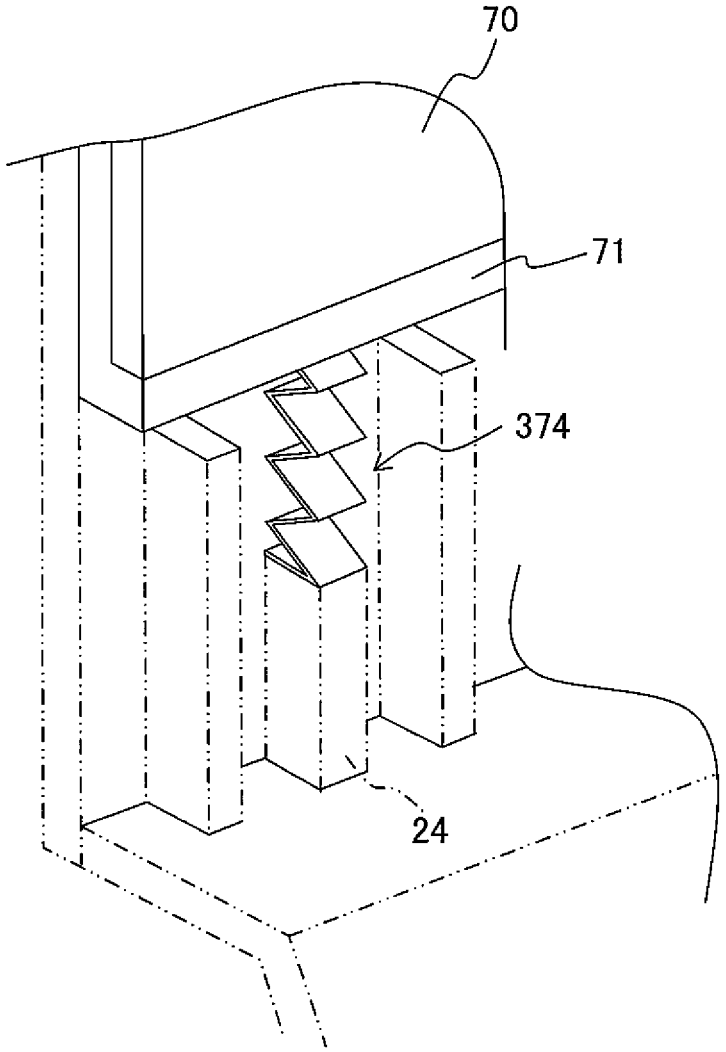
FIG. 10 is an enlarged perspective view showing a portion in the vicinity of the impact-absorbing portion of the wiper in still another modified embodiment.

For example, as shown in FIG. 8, an impact-absorbing member 174 may be formed by an elastic member which is different from the wiper 70. In this construction, the elastic material of the impact-absorbing member 174 may be the same as that of the wiper 70, or the elastic material of the impact-absorbing member 174 may differ from that of the wiper 70 in the Young's modulus. Further, as shown in FIG. 9, an impact-absorbing member 274 may be formed by a porous member such as a sponge. Further, as shown in FIG. 10, an impact-absorbing portion 374 may be a spring which is arranged to be extensible/contractible in the upward and downward directions. It is noted that each of the impact-absorbing portions 174, 274, 374 described above may be attached on the lower surface of the wiper holder or on the upper surface of the rib.

Figure 11:
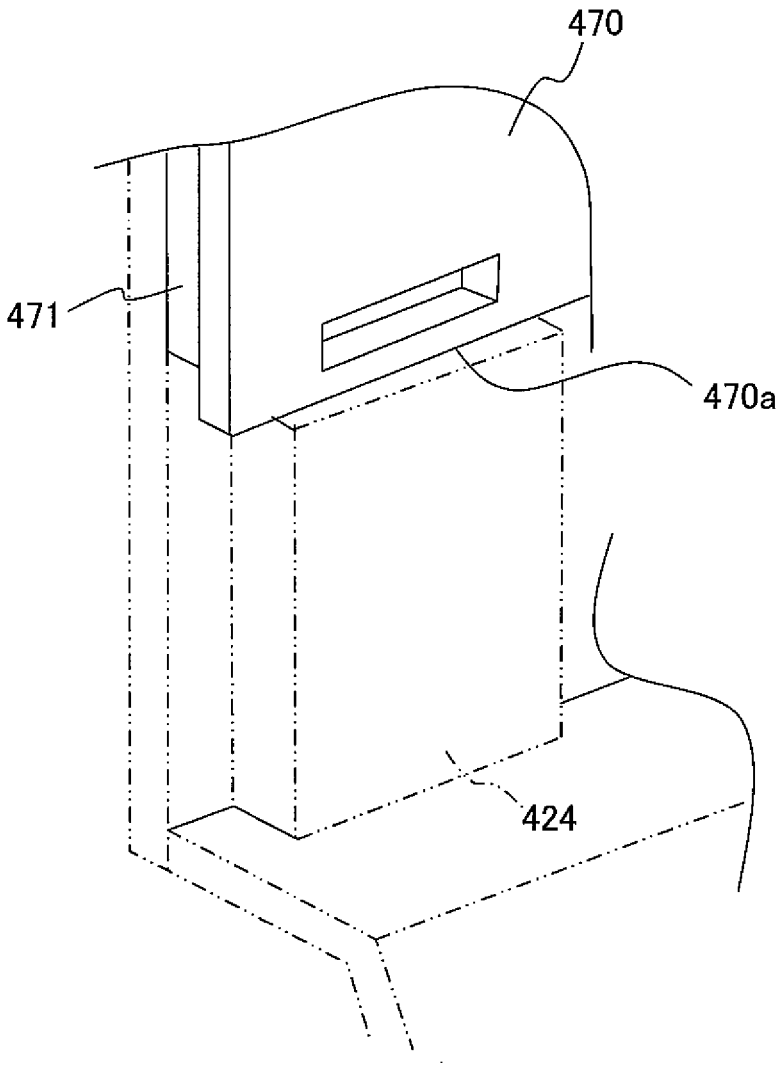
FIG. 11 is an enlarged perspective view showing a portion in the vicinity of the impact-absorbing portion of the wiper in yet another modified embodiment.

Further, in this embodiment, the impact-absorbing member 74 protrudes from the part of the lower surface of the wiper 70. However, as shown in FIG. 11, an entire surface of a lower surface 470a of a wiper 470 may be the impact-absorbing portion. In this construction, the wiper holder 471 is attached to the side surface of the wiper 470. Then, a part of the lower surface 470a of the wiper 470 is brought in contact with a rib 424.

Figure 12:
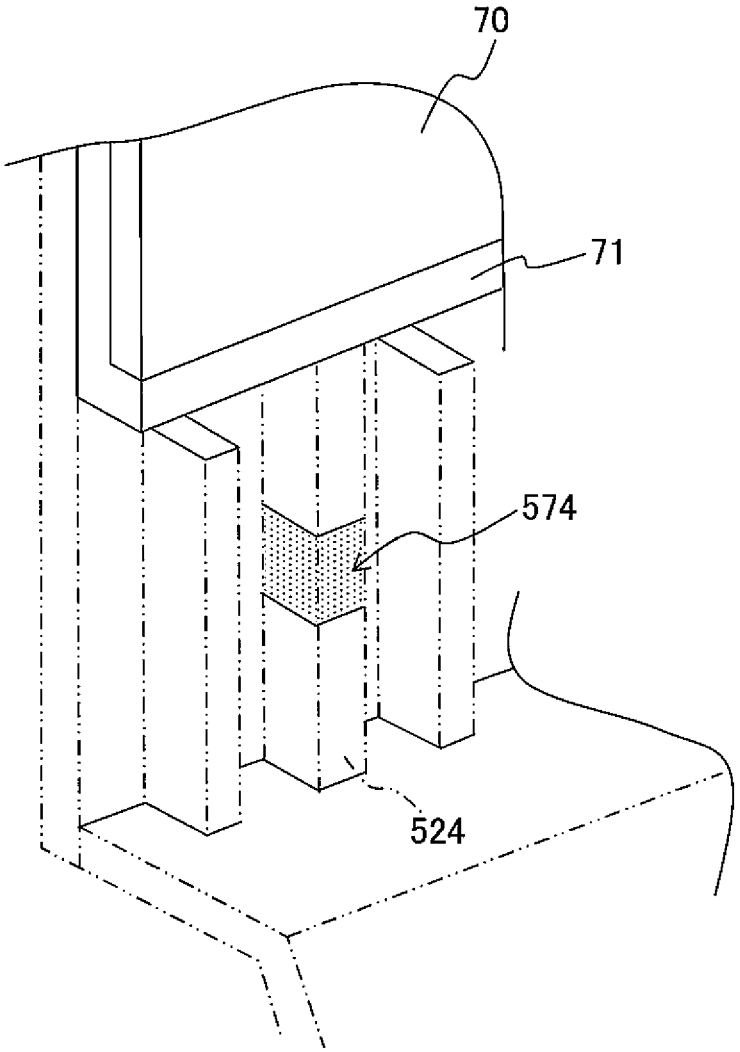
FIG. 12 is an enlarged perspective view showing a portion in the vicinity of the impact-absorbing portion of the wiper in a further modified embodiment.

In the embodiment and modified embodiments, each of the impact-absorbing portions 74, 174, 274, 374 is disposed between the wiper and the rib. However, the present teaching is not limited thereto. The impact-absorbing portion may be disposed on at least one of the wiper and the rib. For example, as shown in FIG. 12, it is allowable that an impact-absorbing portion 574 is arranged in a rib 524 so that the wiper comes into direct contact with the rib.

In the embodiment, the impact-absorbing portion 74 is brought in contact with the rib 24, which has the small width and is provided in the maintenance base 20, to absorb the impact locally. However, the present teaching is not limited thereto. For example, it is allowable that the impact-absorbing portion 74 is brought in contact with a flat surface provided in the maintenance base 20 without providing the rib 24.

Figure 13:
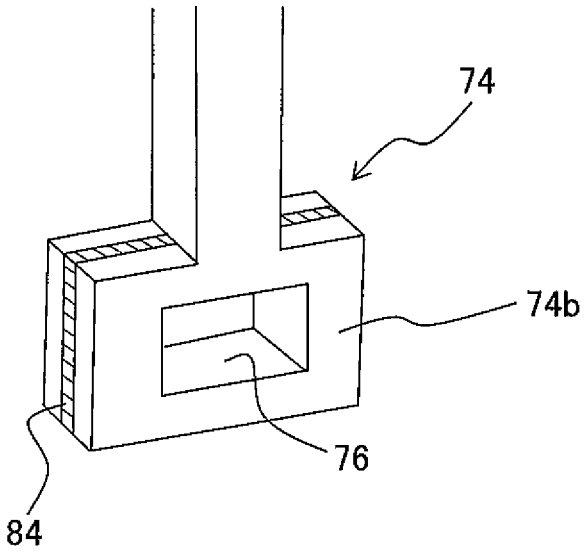
FIG. 13 is a diagram showing a groove provided in a contact portion of the impact-absorbing portion.

In the embodiment, the capillary force acts on the ink by providing the stepped portion 79 in the contact portion 74b of the impact-absorbing portion 74 to form the valley-shaped edge 77. However, the present teaching is not limited thereto. For example, as shown in FIG. 13, it is allowable that the capillary force acts on the ink by forming a groove 84 on a side surface and a bottom surface of the contact portion 74b of the impact-absorbing portion 74. The groove 84 is desirably formed to communicate with the groove 24a when the contact portion 74b of the impact-absorbing portion 74 makes contact with the rib 24.

In the embodiment, the wiper 70 is moved downwardly by the biasing force of the tension spring 64 to make contact with the rib 24. However, the present teaching is not limited thereto. For example, any biasing mechanism which biases the wiper 70 downwardly may be provided instead of the tension spring 64. For example, a pair of magnets (or electromagnets) may be used instead of the tension spring 64 to bias the wiper 70 downwardly by the magnetic force. Or, the following configuration is allowable. That is, the wiper 70 is fallen by the self-weight to make contact with the rib 24 without providing the biasing mechanism by which the wiper 70 is moved downwardly, such as the tension spring 64.

In the embodiment, the through hole 76 penetrating in the scanning direction is formed in the contact portion 74b of the impact-absorbing portion 74. However, the through hole may be formed by penetrating in any direction, such as the transport direction, without being limited to the scanning direction, provided that the thin portion 78 which is thin in the upward and downward directions can be formed.

Figure 14A:
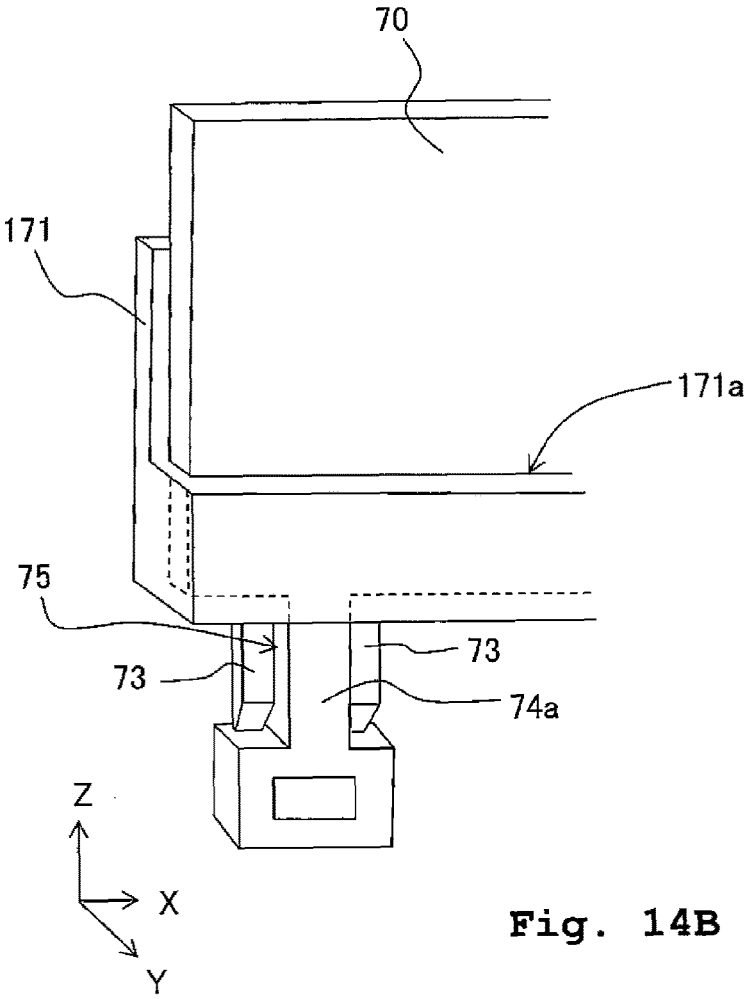
FIGS. 14A and 14B are views each schematically showing a wiper holder including a pocket portion.
Figure 14B:
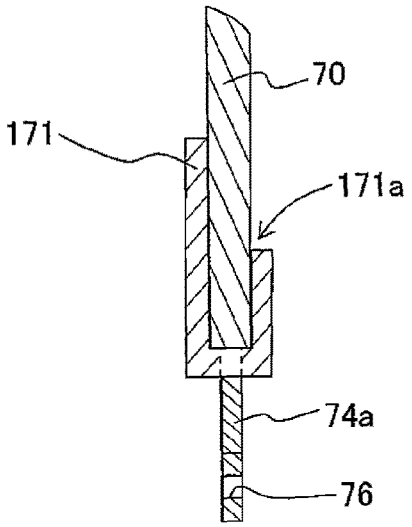

In this embodiment, as shown in FIG. 5, the wiper holder 71 is formed to make contact only with the surface of the wiper 70 on one side in the scanning direction (surface on the side opposite to the paper surface of FIGS. 6A to 6D). However, the present teaching is not limited thereto. For example, as shown in FIGS. 14A and 14B, the following configuration is allowable. That is, there is formed a pocket portion 171a, which is formed into an approximate U shape in a cross-sectional view, on the lower side of the wiper holder 171. The wiper 70 is inserted into the pocket portion 171a. In this case, since the pocket portion 171a is formed in the wiper holder 171, the wiper holder 171 is capable of supporting the wiper 70 so that the wiper holder 171 is brought in contact with the surfaces on the both sides of the wiper 70 in the scanning direction. With this configuration, it is possible to support the wiper 70 more reliably as compared with the wiper holder 71. Further, a gap to such an extent that the capillary force acts on the ink is formed between the pocket portion 171a and the wiper 70. Thus, the ink adhered on the wiper 70 at the time of the wiping operation of the wiper 70 may pass through the gap between the pocket portion 171a and the wiper 70, and may further pass through the gap 75 formed by the two projections 73 and the connection portion 74a. Accordingly, it is possible to reliably move the ink adhered on the wiper 70 at the time of the wiping operation of the wiper 70 toward the foam 81.

In the embodiment, as to the timing at which the wiping operation to wipe the ink jetting surface 4a by the wiper 70 is performed, the explanation is made about the case in which the wiping operation is performed after the suction purge in which the ink is sucked and discharged from the nozzles 16. However, the wiping operation may be performed at any timing. For example, the wiping operation may be performed in a case that the printing operations are performed a plurality of times and thereby a part of the ink discharged from the nozzles 16 is more likely to be adhered on the ink jetting surface 4a.

In the embodiment, the wiper 70 is moved, relative to the ink jetting surface 4a, in the wiping direction parallel to the scanning direction, by utilizing the movement of the serial-type ink jet head 4 in the scanning direction. However, the present teaching is not limited thereto. For example, the present teaching is applicable to the line-type ink jet head. In this case, a moving mechanism to move the wiper 70 in the wiping direction may be provided to move the wiper 70, relative to the ink jetting surface 4a, in the wiping direction.

The embodiment and the modified embodiments thereof explained above are examples in which the present teaching is applied to the ink-jet printer for recording, for example, the image by jetting the ink to the recording paper sheet P. However, the application objective of the present teaching is not limited to the ink-jet printer as described above. The liquid to be jetted is not necessarily limited to the ink, and the present teaching is applicable to any liquid jetting apparatuses usable in various technical fields.

What is claimed is:

1. A liquid jetting apparatus which jets liquid, comprising:

a liquid jetting head which has a liquid jetting surface on which a plurality of nozzles are open to jet the liquid;

a wiper which moves, relative to the liquid jetting surface, in a wiping direction along the liquid jetting surface, while being in contact with the liquid jetting surface, to wipe the liquid adhered on the liquid jetting surface;

a wiper moving mechanism which moves the wiper in a moving direction orthogonal to the liquid jetting surface to approach to or separate from the ink jetting surface;

a stopper which makes contact with the wiper being separated from the ink jetting surface in the moving direction; and an impact-absorbing member which is formed in the wiper or the stopper to absorb an impact generated by a collision between the wiper and the stopper.

2. The liquid jetting apparatus according to claim 1, further comprising:

a biasing mechanism which biases the wiper toward the stopper.

3. The liquid jetting apparatus according to claim 1;

wherein the wiper is formed of an elastic material; and wherein the impact-absorbing member is formed integrally with the wiper.

4. The liquid jetting apparatus according to claim 3;

wherein a protruding portion is formed in an end surface of the wiper to protrude from the end surface of the wiper; and wherein the protruding portion of the wiper makes contact with the stopper as the impact-absorbing member.

5. The liquid jetting apparatus according claim 4;

wherein the protruding portion of the wiper has a side portion and a contact portion which is different from the side portion and which makes contact with the stopper; and wherein the liquid jetting apparatus further comprising a regulating member which makes contact with the side portion of the protruding portion and which regulates bending of the protruding portion generated in a case that the protruding portion makes contact with the stopper.

6. The liquid jetting apparatus according to claim 5, further comprising:

a wiper holder which holds the wiper, wherein the regulating members are formed integrally with the wiper holder.

7. The liquid jetting apparatus according to claim 4;

wherein the protruding portion has a contact portion which makes contact with the stopper, and a connection portion which connects the wiper with the contact portion, which has a width which is smaller than that of the contact portion, and which has a shape to be recessed with respect to the wiper and the contact portion; and wherein the liquid jetting apparatus further comprising regulating member which is arranged to sandwich the connection portion and which regulates bending of the protruding portion generated in a case that the protruding portion makes contact with the stopper.

8. The liquid jetting apparatus according to claim 7;

wherein the regulating members and the connection portion are arranged to form a gap therebetween.

9. The liquid jetting apparatus according to claim 8;

wherein the gap is formed to have a width which is enough narrow to exert a capillary force on the liquid entered in the gap.

10. The liquid jetting apparatus according to claim 3;

wherein a stepped portion or a recess portion is formed to extend, in a side portion of the impact-absorbing member which is different from a contact portion of the impact-absorbing member which makes contact with the stopper, toward the contact portion; and a valley-shaped edge is formed by the stepped portion or the recess portion on the side portion of the impact-absorbing member.

11. The liquid jetting apparatus according to claim 10;

wherein a groove which communicates with the valley-shaped edge of the impact-absorbing member is formed in the stopper.

12. The liquid jetting apparatus according to claim 3;

wherein a stepped portion or a recess portion is formed to extend, in a side portion of the impact-absorbing member which is different from a contact portion making contact with the stopper, toward an end portion of the impact-absorbing member which makes contact with the stopper, wherein a valley-shaped edge is formed by the stepped portion or the recess portion on the side portion of the impact-absorbing member, wherein a groove which communicates with the valley-shaped edge of the impact-absorbing member is formed in the stopper, and wherein the gap, the valley-shaped edge and the groove are communicate with each other to form a liquid passage through which the liquid adhered to the wiper flows.

13. The liquid jetting apparatus according to claim 1;

wherein the impact-absorbing member is formed of an elastic material; and wherein a hole which penetrates in the wiping direction is formed in the impact-absorbing member.

*14. A liquid jetting apparatus, comprising:*

*a liquid jetting head including a liquid jetting surface;*

*a wiper which moves, relative to the liquid jetting surface, in a wiping direction along the liquid jetting surface, while being in contact with the liquid jetting surface, to wipe liquid adhered to the liquid jetting surface;*

*a wiper support plate that supports a back surface of the wiper;*

*a bottom plate extending from the wiper support plate below the wiper to receive the liquid wiped by the wiper;*

*a foam to absorb the liquid wiped by the wiper, the foam disposed on the bottom plate and spaced laterally from the wiper support plate; and*

*a stopper directly below the wiper and supported by the bottom plate.*

*15. The liquid jetting apparatus of claim 14, wherein the back surface of the wiper includes a first planar surface, and wherein the bottom plate includes a second planar surface that is perpendicular to the first planar surface.*

*16. The liquid jetting apparatus of claim 14, further comprising a wiper holder disposed between the wiper support plate and the back surface of the wiper.*

*17. The liquid jetting apparatus of claim 14, further comprising:*

*a wiper driver configured to move the wiper in upward and downward directions with respect to the bottom plate, such that the wiper is movable between a wiping position at which the wiper is brought in contact with the liquid jetting surface, and a waiting position at which the wiper and the liquid jetting surface are separated, wherein the wiper contacts the stopper when the wiper is in the waiting position; and*

*an impact-absorbing member formed in the wiper or the stopper to absorb an impact generated by a collision between the wiper and the stopper when the wiper is moved to the waiting position.*

*18. The liquid jetting apparatus of claim 14, wherein the bottom plate includes a first surface directly below the wiper that abuts and extends directly from the wiper support plate, and a second surface positioned in a downward direction relative to the first surface, the foam disposed on the second surface such that the foam is separated in the downward direction from the wiper support plate.*

*19. The liquid jetting apparatus of claim 18, wherein the second surface is sloped and extends directly from the first surface in the downward direction.*

*20. A liquid jetting apparatus, comprising:*

*a liquid jetting head which has a liquid jetting surface;*

*a wiper which moves, relative to the liquid jetting surface, in a wiping direction along the liquid jetting surface, while being in contact with the liquid jetting surface, to wipe the liquid adhered on the liquid jetting surface;*

*a wiper support plate that supports a back surface of the wiper, the wiper support surface having a bottom end;*

*a bottom plate extending from the bottom end of the wiper support plate to receive the liquid wiped by the wiper, the bottom plate including a first surface directly below the wiper that abuts and extends directly from the bottom end of the wiper support plate, and a second surface positioned in a downward direction relative to the first surface;*

*a foam on the second surface such that the foam is separated in the downward direction from the bottom end of the wiper support plate, the foam configured to absorb the liquid wiped by the wiper;*

*a stopper directly below the wiper and supported by the first surface;*

*a wiper driver configured to move the wiper in upward and downward directions with respect to the bottom plate, such that the wiper is movable between a wiping position at which an upper surface of the wiper is brought in contact with the liquid jetting surface, and a waiting position at which the wiper and the liquid jetting surface are separated, wherein the wiper contacts the stopper when the wiper is in the waiting position; and*

*an impact-absorbing member formed in the wiper or the stopper to absorb an impact generated by a collision between the wiper and the stopper when the wiper is moved to the waiting position.*

*21. The liquid jetting apparatus of claim 20, wherein the second surface is spaced laterally from the wiper support plate such that the foam is spaced laterally from the wiper support plate.*

*22. The liquid jetting apparatus of claim 20, further comprising a wiper holder disposed between the wiper support plate and the back surface of the wiper.*

*23. The liquid jetting apparatus of claim 20, wherein the second surface is sloped and extends directly from the first surface in the downward direction.*

*24. A liquid jetting apparatus, comprising:*

*a liquid jetting head including a liquid jetting surface;*

*a wiper which moves, relative to the liquid jetting surface, in a wiping direction along the liquid jetting surface, while being in contact with the liquid jetting surface, to wipe liquid adhered to the liquid jetting surface;*

*a wiper holder holding the wiper and directly contacting the wiper;*

*a wiper support plate that supports a back surface of the wiper holder;*

*a bottom plate positioned below the wiper, the bottom plate extending from the wiper support plate in a direction from the back surface of the wiper holder toward a front surface of the wiper holder, the bottom plate disposed to be separated from both of a bottom end of the wiper holder and a bottom end of the wiper in a downward direction; and*

*a foam to absorb the liquid wiped by the wiper, the foam disposed on the bottom plate and spaced laterally from the wiper support plate, the foam disposed to be separated from the bottom end of the wiper holder in the downward direction.*

*25. A liquid jetting apparatus, comprising:*

*a liquid jetting head including a liquid jetting surface;*

*a wiper which moves, relative to the liquid jetting surface, in a wiping direction along the liquid jetting surface, while being in contact with the liquid jetting surface, to wipe liquid adhered to the liquid jetting surface;*

*a wiper holder holding the wiper and directly contacting the wiper;*

*a wiper support plate that supports a back surface of the wiper holder;*

*a bottom plate extending from the wiper support plate below the wiper to receive the liquid wiped by the wiper, the bottom plate including a first surface directly below the wiper disposed to be separated from both of a bottom end of the wiper holder and a bottom end of the wiper in a downward direction and extending directly from the wiper support plate in a direction from the back surface of the wiper holder toward a front surface of the wiper holder, and a second surface positioned in a downward direction relative to the first surface;*

*a foam on the second surface such that the foam is separated in the downward direction from the bottom end of the wiper support plate, the foam disposed to be separated from the bottom end of the wiper holder in the downward direction, the foam configured to absorb the liquid wiped by the wiper.*

*26. The liquid jetting apparatus according to claim 25, wherein the second surface extends from the first surface in the downward direction.*

*27. The liquid jetting apparatus according to claim 25, further comprising:*

*a cap configured to cover the liquid jetting surface; and*

*a housing where the cap is attached to move in an upward direction and the downward direction,*

*wherein the front surface of the wiper holder faces the cap in the direction from the back surface of the wiper holder toward the front surface of the wiper holder.*

*28. The liquid jetting apparatus according to claim 27, further comprising:*

*a pump disposed at an outside of the housing; and*

*a tube connecting the cap and the pump,*

*wherein the tube comprises a first portion extending from the cap in the downward direction and a second portion extending toward the direction from the back surface of the wiper holder toward the front surface of the wiper holder in the housing.*

*29. The liquid jetting apparatus according to claim 24, further comprising:*

*a cap configured to cover the liquid jetting surface; and*

*a housing where the cap is attached to move in an upward direction and the downward direction,*

*wherein the front surface of the wiper holder faces the cap in the direction from the back surface of the wiper holder toward the front surface of the wiper holder.*

*30. The liquid jetting apparatus according to claim 29, further comprising:*

*a pump disposed at an outside of the housing; and*

*a tube connecting the cap and the pump,*

*wherein the tube comprises a first portion extending from the cap in the downward direction and a second portion extending toward the direction from the back surface of the wiper holder toward the front surface of the wiper holder in the housing.*

* * * * *